Sept. 16, 1969           P. KORWIN           3,467,504

APPARATUS FOR HYDROCARBON REFORMING

Filed March 15, 1965           4 Sheets-Sheet 1

PAUL KORWIN

INVENTOR.

BY J. T. Chabot

AGENT

PAUL KORWIN
INVENTOR.

PAUL KORWIN
INVENTOR.

Sept. 16, 1969    P. KORWIN    3,467,504
APPARATUS FOR HYDROCARBON REFORMING
Filed March 15, 1965    4 Sheets-Sheet 4

PAUL KORWIN
INVENTOR.

BY  J-T Chaloty
AGENT 3,467,504
APPARATUS FOR HYDROCARBON REFORMING
Paul Korwin, Flushing, N.Y., assignor to Chemical Construction Corporation, New York, N.Y., a corporation of Delaware
Filed Mar. 15, 1965, Ser. No. 439,601
Int. Cl. B01j 9/04; C10j 1/00
U.S. Cl. 23—288    5 Claims

ABSTRACT OF THE DISCLOSURE

An apparatus combination for the catalytic reforming of a hydrocarbon-containing gas stream with air, in which the reaction container is provided with an upper outlet for product gas, an upper bed of catalyst particles, stacked courses of firebrick or other refractory material below the bed, and a lower combustion container horizontally oriented in the lower part of the reaction container. The combustion container is composed of refractory shapes and has a central axially oriented horizontal gas passage and a plurality of spaced upper openings. The hydrocarbon-containing gas and process air are passed into the lower combustion container and react in this container, thereafter flowing upwards through the spaced upper openings, stacked courses of firebrick, and catalyst bed, and the catalytically reformed gas is then discharged through the upper outlet.

---

The present invention relates to the catalytic reforming of fluid hydrocarbons with air, and more particularly to the catalytic secondary reforming with air of a hydrocarbon-containing gas stream derived from catalytic primary steam reforming of a fluid hydrocarbon. An improved apparatus is provided, which accomplishes uniform distribution within the catalytic reforming apparatus of the process gas stream derived from reaction between process air and the hydrocarbon-containing gas stream, which takes place in a novel combustion container. In addition, the apparatus of the present invention provides improved support of the combustion container and the catalyst bed.

The apparatus of the present invention will be described with respect to the process sequence known as secondary reforming, although it will be understood that the apparatus is equally applicable to hydrocarbon reforming in general, or to any catalytic reforming reaction between a fluid hydrocarbon and air to produce a hydrogen-containing gas stream, such as is described in U.S. Patent No. 3,071,454. Secondary reforming is carried out after the primary steam reforming of a fluid hydrocarbon, which consists of a catalytic reaction between steam and a fluid hydrocarbon such as methane. The primary reforming reaction is endothermic, and is usually conducted by passing a mixture of methane and steam through a plurality of externally heated tubes filled with reforming catalyst. The resulting effluent gas stream from primary reforming contains unreacted methane, carbon monoxide, hydrogen and excess steam, and is customarily passed to secondary reforming, particularly when ammonia synthesis gas is the desired final product.

In the secondary reforming reaction, the hot process gas stream from primary reforming is mixed with process air whereupon exothermic reaction takes place between the oxygen content of the air and components of the process gas stream, with concomitant further elevation of the gas stream temperature. The resultant gas mixture is passed through a bed of reform catalyst, usually consisting of nickel or cobalt deposited on a suitable carrier, and further catalytic reforming of the methane in the gas stream takes place. The resultant gas stream produced by secondary reforming is then cooled in a waste heat boiler and passed to further processing, such as catalytic reaction of carbon monoxide with steam to produce further hydrogen and removal of carbon dioxide by scrubbing with a suitable absorbent solution such as aqueous monoethanolamine or potassium carbonate, prior to final utilization as ammonia synthesis gas or for other purposes.

The conventional prior art apparatus for carrying out secondary reform or other reforming of hydrocarbons with air consists generally of a refractory-lined vertically oriented vessel in which a horizontal bed of reform catalyst is centrally disposed. The reactant streams of process air and hydrocarbon-containing process gas are admitted into the vessel above the catalyst bed, and reaction between the process streams rapidly takes place in an open space provided in the upper part of the vessel. The resulting hot mixed process stream then flows downward within the vessel and through the catalyst bed, wherein the reform reaction takes place. The resulting reformed process gas stream is withdrawn from the vessel below the catalyst bed. In some cases, an opposite flow sequence is provided, wherein the inlet process streams are admitted into the vessel below the catalyst bed and are reacted in the lower part of the vessel, thereafter flowing upward through the catalyst bed and to an upper vessel outlet.

It has been found that this prior art apparatus is subject to certain deficiencies in practice. There is usually a tendency for uneven flow and channeling of the gas stream as it flows through the catalyst bed, because the gas stream does not become evenly distributed before the catalyst bed due to turbulence in the mixing of the process air with the hydrocarbon-containing gas stream. In addition, support of the catalyst bed is difficult in practice, because support is usually accomplished by providing a heavy cast alloy grating and a series of piers and arches, which leads to concentration of the heavy load of the catalyst bed on small surfaces and areas. Under the sustained elevated temperature conditions maintained in the secondary reformer, sagging and eventual collapse of these supports has been encountered in practice.

In the present invention, an apparatus combination is provided which eliminates these objections and disadvantages of prior art apparatus. The apparatus of the present invention provides an elongated combustion container horizontally disposed in the lower part of the secondary reformer vessel, below the catalyst bed. The combustion container is provided with a plurality of spaced upper openings extending from a central passage in which the feed streams of process air and hydrocarbon-containing gas are reacted. At least one horizontal layer of parallel spaced apart refractory linear shapes are provided between the combustion container and the catalyst bed. The parallel linear shapes preferably consist of refractory bricks, laid end to end in parallel spaced apart rows. Each horizontal layer of rows of bricks constitutes a course of brick, and preferably a plurality of courses is provided. In any case, the parallel rows of refractory shapes such as brick serve to uniformly distribute the gas mixture rising through the openings in the combustion container, so that the gas mixture flows uniformly upward and is evenly distributed across the horizontal cross-section of the vessel, prior to flowing into the catalyst bed. The combustion container is preferably composed of two alternating series of vertically oriented refractory guides, the first series of guides being rectangular with a central opening and the second series of guides being rectangular, shorter than the first series, and provided with an upper recess. The central openings in the first series of guides and the upper recesses in the second series of guides are aligned so as to provide the central passage in the combustion container for reaction of the feed streams of air and hydrocarbon-containing gas. The assemblage of combustion container and courses of refractory brick has an additional function of supporting the catalyst bed, with the lowermost course of brick and the combustion container preferably resting on a mass of cast refractory disposed in the bottom of the reformer vessel. Inlet means are provided for passing the feed streams into the vessel for mixing and reaction in the central passage in the combustion container, and an upper gas outlet is provided in the vessel above the catalyst bed for removal of the reformed gas stream.

The apparatus of the present invention has two main advantages. One advantage involves the uniform and even distribution into the catalyst bed of the mixed gas stream rising from the spaced upper openings in the combustion container. The provision of the spaced openings, together with the parallel spaced apart linear refractory shapes such as parallel rows of refractory brick, between the combustion container and the catalyst bed, serves to evenly distribute the rising gas stream into the catalyst bed, and prevents the channeling and uneven distribution encountered in the prior art. Another advantage of the present invention involves improved support of the catalyst bed. The catalyst bed is a heavy and dense plurality of catalytically active particles, usually having a density in the range of 50 to 100 lbs./cubic foot. This heavy load is evenly distributed onto the parallel rows of refractory shapes or bricks, and is thereafter uniformly transmitted to the cast refractory mass in the bottom of the vessel. Thus, an equal distribution of the stresses on the refractory and the load on the shell is attained, and the apparatus assemblage operates for prolonged periods of time at elevated temperature without danger of unequal stresses and possible collapse of the catalyst bed support.

It is an object of the present invention to provide an improved apparatus for the catalytic reforming of hydrocarbon with air.

Another object is to provide an improved apparatus for the catalytic secondary reforming of a hydrocarbon-containing gas stream derived from the primary steam reforming of a fluid hydrocarbon.

A further object is to provide an improved apparatus for distribution of the mixed gas stream to a catalyst bed in the catalytic reforming of a hydrocarbon with air.

An additional object is to provide an improved apparatus for the reaction of a hydrocarbon-containing gas stream with air prior to catalytic reforming.

Still another object is to provide an improved apparatus for reaction of process gas streams and support of the catalyst bed in the catalytic reform of a hydrocarbon-containing gas stream with air.

These and other objects and advantages of the present invention will become evident from the description and figures which follow. Referring to the figures, FIGURE 1 is an overall elevation view of the apparatus assemblage of the present invention, FIGURE 2 is a sectional elevation view of FIGURE 1, taken on section 2—2, FIGURE 3 is a sectional plan view of FIGURE 1, taken on sections 3—3, FIGURE 4 is an enlarged view of the mixer-combustor conduit of the present invention, FIGURE 5 is an isometric view of one type of refractory guide provided in the combustion container of the present invention, FIGURE 6 is an isometric view of the other type of refractory guide provided in the combustion container of the present invention, and FIGURE 7 is an isometric view of adjacent refractory guides.

Referring now to FIGURE 1, the reforming apparatus is contained in vertically oriented vessel 1, which is usually provided with refractory lining 2. Vessel 1 is preferably cylindrical, although other forms such as a rectangular form may be provided as an alternative in practice. A first conduit 3 is provided, extending into the lower part of vessel 1 and terminating with an outlet opening, preferably comprising a plurality of small outlet holes which provide a foraminous outlet. A process air stream 4 is passed by blower means 5 into conduit 3, and is discharged into the vessel 1 through the foraminous outlet of conduit 3. A second conduit 6 is provided, extending into vessel 1 and being external to and coaxial with conduit 3. A hydrocarbon-containing gas stream 7 is passed by blower means 8 into the annular passage between conduits 3 and 6, and is dispersed into the vessel adjacent to the holes in conduit 3, thus mixing and reacting with stream 4. Stream 7 preferably consists of a partially reformed gas stream derived from the catalytic primary reforming of a fluid hydrocarbon with steam. In this case stream 7 will contain unreacted hydrocarbon, hydrogen, carbon monoxide and water vapor.

The streams 4 and 7 are discharged into a combustion container which is horizontally disposed in the lower part of vessel 1 and provided with a central passage and a plurality of spaced upper openings. The combustion container may be provided as a single unit, however it is preferably formed by providing a first plurality of upright rectangular refractory guides 9 having central openings which are preferably circular, and a second plurality of upright rectangular refractory guides 10 having upper recesses which are preferably semi-circular and aligned with the lower halves of the openings in guides 9. The guides 9 alternate with the guides 10 so as to provide a combustion container with a continuous central passage and a plurality of spaced upper openings between the guides 9. The guides 9 and 10 are supported on cast refractory mass 11.

The gas streams 4 and 7 mix in the central horizontal passage of the combustion container defined by guides 9 and 10, and the oxygen content of the air stream 4 reacts with components of stream 7, thus raising the temperature of the mixed gas stream. A refractory barrier 12 is provided, to deflect flame which impinges on the end of the central passage. The resulting mixed gas stream, now at a highly elevated temperature, rises through the openings between guides 9 and passes through a plurality of courses of refractory brick 13. Each course of brick 13 consists of a plurality of parallel rows of refractory brick with individual brick laid end to end, and with the rows being spaced apart to allow upward passage of gas. In addition, the parallel rows of brick in each course are disposed at a right angle relative to the rows in an adjacent course. Thus, the gas stream rising through the courses of refractory brick 13 is uniformly dispersed across the horizontal interior cross-section of the vessel 1.

The raising gas stream next passes through foraminous screen 14 and into catalyst bed 15. Screen 14 serves to support the catalyst bed above the uppermost course of brick and rests on the parallel rows of brick of the uppermost course. Thus, the discrete particles of the catalyst bed are prevented from falling between the spaced apart parallel rows of brick. As the hot gas stream passes upward through the catalyst bed 15, catalytic reforming of the unreacted hydrocarbon content takes place. The resulting gas stream, now fully reformed and substantially free of hydrocarbon, continues upward through vessel 1 and is discharged as stream 16 via upper outlet 17.

Referring now to FIGURE 2, a sectional elevation view of FIGURE 1, taken on section 2—2 is presented. The gas stream is shown rising and also flowing laterally from the central passage defined by the openings in guides 9 and 10. Lateral flow of the gas stream takes place through courses of refractory brick 18, which extend adjacent to the combustion container and also support the upper courses of brick 13. The courses of brick 18 are each composed of parallel spaced apart rows of brick and the lowermost course of brick 18 rests on cast refractory mass 11.

FIGURE 3 is a sectional plan view of FIGURE 1, taken on sections 3—3. The left half of FIGURE 3 shows two courses of brick 13, in which the parallel spaced apart rows of brick in the upper course are disposed at a right angle to the parallel spaced apart rows of brick in the lower course. The right half of FIGURE 3 shows a portion of the combustion container defined by alternate guides 9 and 10, as well as two courses of brick 18.

FIGURE 4 shows a preferred embodiment of the discharge end of conduit 3, in which the plurality of holes 19 in the foraminous end of conduit 3 are disposed in parallel spiral rows, so as to uniformly distribute stream 4 into stream 7.

Figure 1:
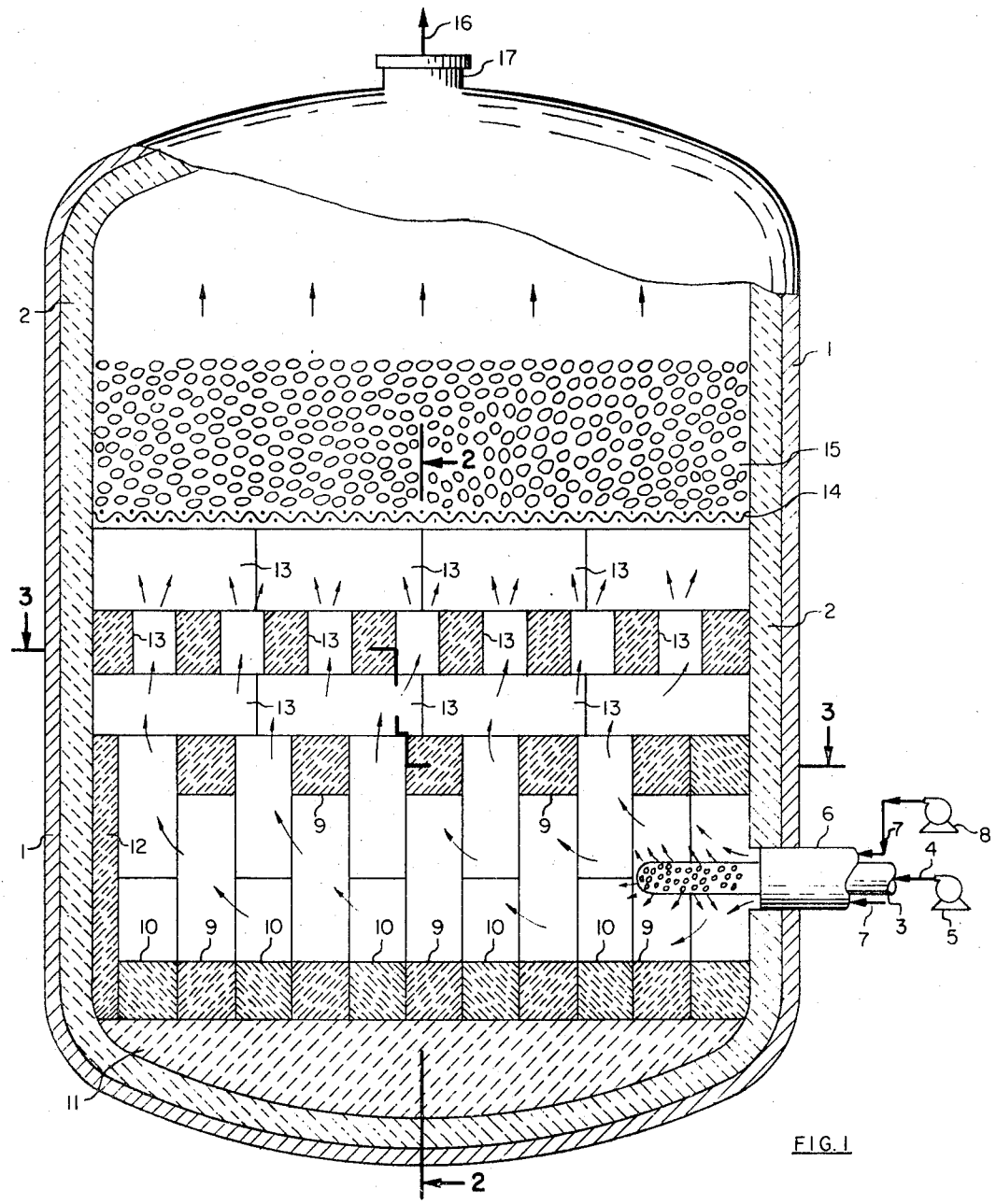
Figure 2:
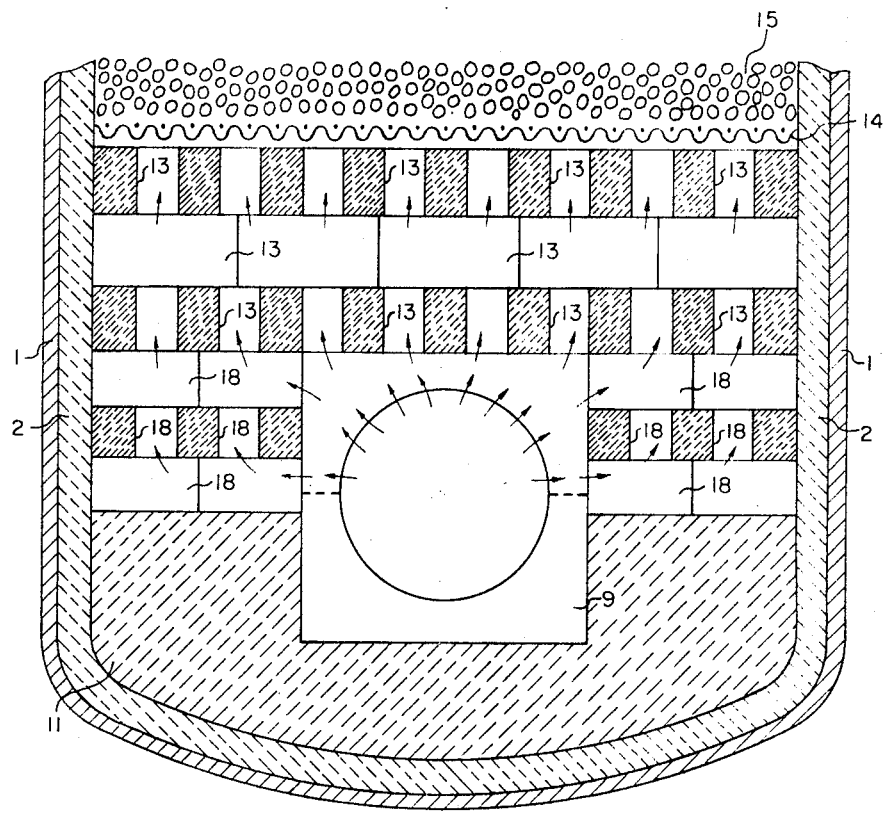
Figure 3:
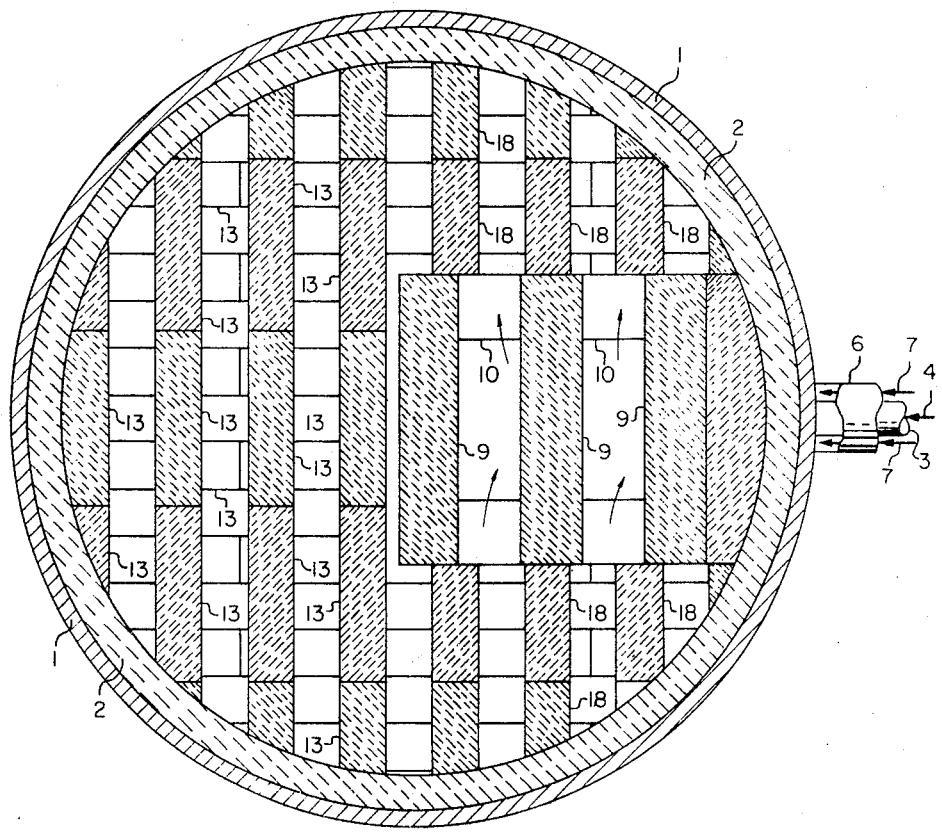
Figure 4:
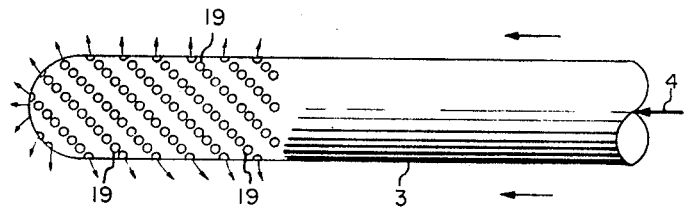
Figures 5, 6:
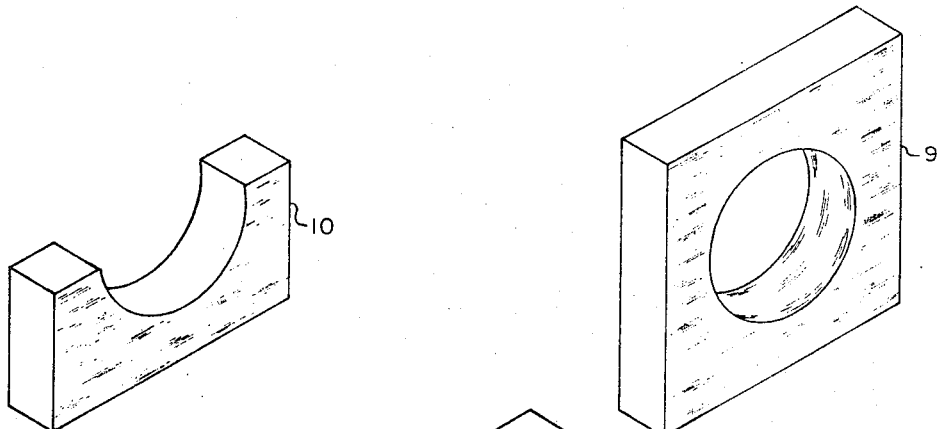
FIGURE 5 illustrates the refractory guide 10 in isometric view, showing the upper semi-circular recess.
FIGURE 6 illustrates the refractory guide 9 in isometric view, showing the central circular opening.
Figure 7:
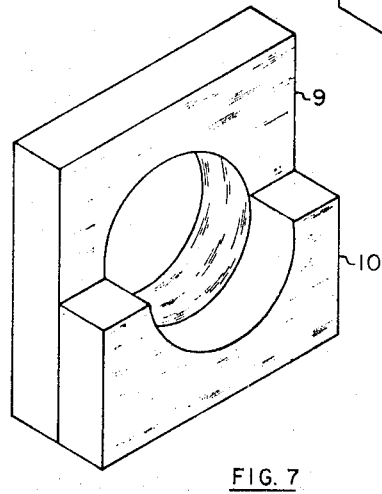

FIGURE 7 shows the disposition of adjacent guides 9 and 10 in isometric view. The upper semi-circular recess in guide 10 is aligned opposite the lower half of the circular opening in guide 9, so as to form a smooth continuous passage for gas flow.

Numerous alternatives within the scope of the present invention will occur to those skilled in the art. Thus, alternative means may be provided for passing the reactant streams 4 and 7 into the central passage in the combustion container, besides the concentric and coaxial conduits 3 and 6. These alternate means may consist, for example, of two adjacent parallel conduits extending into the central passage in the combustion container. As mentioned supra, the combustion container itself may consist of a single extended apparatus element, extending horizontally along a diameter of the vessel 1 and disposed in the lower part of the vessel. In this case, the combustion container would consist of a single refractory element with a central passage and a plurality of upper openings for outlet of the mixed gas stream. Refractory barrier 12 may be omitted in some instances, with its function being performed by an integral section of the combustion container by providing a closed end for the container. The cast refractory mass 11 may be replaced in some instances by additional courses of refractory brick, although this alternative is relatively less desirable because the weight of the catalyst bed would be distributed to the vessel bottom in an irregular manner.

Although a plurality of courses of brick 13 are preferable, in order to insure even distribution of the rising gas stream, in some cases a single horizontal course of brick 13 above guides 9 and 10 and consisting of a plurality of parallel spaced apart rows of brick may be sufficient to attain uniform gas distribution. In addition, functionally equivalent apparatus elements may be substituted for the courses of brick 13, thus the parallel rows of brick in each course may be replaced by parallel refractory linear prismatic shapes, such as refractory rods of rectangular cross-section. Although the parallel rows of brick 13 in each course are preferably disposed at a right angle relative to the rows of brick in an adjacent course, it is evident that the angle between the rows in adjacent courses may be other than a right angle in suitable instances. The horizontal foraminous screen 14 may be replaced in practice by a functionally equivalent horizontal foraminous plate. Other alternative and functionally equivalent apparatus configurations within the scope of the present invention will occur to those skilled in the art.

I claim:

1. An apparatus for the catalytic secondary reforming of a hydrocarbon-containing gas stream with air to produce a hydrogen-containing gas stream, said hydrocarbon containing gas stream being derived from the catalytic primary reforming of a fluid hydrocarbon with steam and principally containing unreacted hydrocarbon, hydrogen, carbon monoxide and water vapor, which comprises a vertically oriented refractory lined cylindrical vessel, an elongated combustion container horizontally oriented along a diameter in the lower part of said vessel, said combustion container being defined by a first plurality of upright rectangular refractory guides, each of said first guides having a central opening, and a second plurality of upright rectangular refractory guides, each of said second guides having an upper recess, each of said second plurality of guides alternating with each of said first plurality of guides to form said container with an upper opening at each of said second plurality of guides and a horizontal central passage, a first conduit extending through the wall of said vessel and into the central passage in said combustion container, means to pass an air stream through said first conduit and into said central passage, a second conduit extending through the wall of said vessel, said second conduit being external to and coaxial with said first conduit, means to pass said hydrocarbon-containing gas stream through the annular passage between said first and second conduits, whereby said streams combine within said central passage to form a gas mixture and the oxygen in said air stream reacts with said hydrocarbon-containing gas stream, a plurality of horizontal courses of refractory brick disposed above said combustion container, each of said courses of brick comprising a plurality of spaced apart parallel linear rows of brick, with the rows of each course being at an angle relative to the next adjacent course, whereby the gas mixture rising through said upper openings in said combustion container is uniformly distributed across the horizontal cross-section of said vessel, a plurality of catalytically active particles comprising a catalyst bed for gas reform above said courses of brick, a horizontal foraminous screen disposed between said catalyst bed and the uppermost of said courses of brick, and an upper gas outlet opening in said vessel above said catalyst bed for removal of reformed gas from said vessel.

2. The apparatus of claim 1, in which the bricks in each linear row of brick are laid end to end.

3. The apparatus of claim 1, in which the central opening in each of said first guides is circular and the upper recess in each of said second guides is semi-circular, the perimeters of said semi-circular recesses being parallel with the lower halves of said circular central openings, whereby the horizontal central passage in said combustion chamber is substantially cylindrical.

4. An apparatus for the catalytic secondary reforming of hydrocarbon-containing gas stream with air to produce a hydrogen-containing gas stream, said hydrocarbon-containing gas stream being derived from the catalytic primary reforming of a fluid hydrocarbon with steam and principally containing unreacted hydrocarbon, hydrogen, carbon monoxide and water vapor, which comprises a vertically oriented refractory lined cylindrical vessel, an elongated combustion container horizontally oriented along a diameter in the lower part of said vessel, said combustion container being defined by a first plurality of upright rectangular refractory guides, each of said first guides having a circular central opening, and a second plurality of upright rectangular refractory guides, said second plurality of guides having a height one-half that of said first plurality of guides, each of said second guides having an upper semi-circular recess, the perimeters of said semi-circular recesses being parallel with the lower halves of said circular central openings, each of said second plurality of guides alternating with each of said first plurality of guides to form said container with an upper and lateral opening at each of said second plurality of guides and a horizontal cylindrical central passage, a first conduit extending through the wall of said vessel and into the central passage in said combustion container, said first conduit having a closed terminus and being foramious within said central passage, means to pass an air stream through said first conduit and into said central passage, a second conduit extending through the wall of said vessel, said second conduit being external to and coaxial with said first conduit, means to pass said hydrocarbon-containing gas stream through the annular passage between said first and second conduits, whereby said streams combine within said central passage to form a gas mixture and the oxygen in said air stream reacts with said hydrocarbon-containing gas stream, a plurality of horizontal courses of refractory brick disposed adjacent to and above said combustion container, each of said courses of brick comprising a plurality of spaced apart parallel linear rows of brick, with the rows of each course being at a right angle relative to the next adjacent course, whereby the gas mixture rising through said openings in said combustion container is uniformly distributed across the horizontal cross-section of said vessel, a cast refractory support mass between the lowermost of said courses of brick and the bottom of said vessel, a plurality of catalytically active particles comprising a catalyst bed for gas reform above said courses of brick, a horizontal foraminous screen disposed between said catalyst bed and the uppermost of said courses of brick, and an upper gas outlet opening in said vessel above said catalyst bed for removal of reformed gas from said vessel.

5. The apparatus of claim 4, in which the openings in the foraminous end of said first conduit are disposed as a series of parallel openings in a spiral pattern.

References Cited
UNITED STATES PATENTS

| | | | |
|---|---|---|---|
| 2,665,979 | 1/1954 | Taussig | 48—214 XR |
| 2,699,989 | 1/1955 | Houdry | 23—288 |
| 2,921,845 | 1/1960 | Kyle et al. | 48—214 |

MORRIS O. WOLK, Primary Examiner

R. E. SERWIN, Assistant Examiner

U.S. Cl. X.R.

48—196